(12) United States Patent
Cohen et al.

(10) Patent No.: US 7,822,303 B2
(45) Date of Patent: Oct. 26, 2010

(54) OPTICAL WAVELENGTH SELECTIVE ROUTER

(75) Inventors: Gil Cohen, Livingston, NJ (US);
SeongWoo Suh, Budd Lake, NJ (US);
Yossi Corem, Beit Shemesh (IL)

(73) Assignee: Oclaro (New Jersey), Inc., Morris Plains, NJ (US)

( * ) Notice: Subject to any disclaimer, the term of this patent is extended or adjusted under 35 U.S.C. 154(b) by 217 days.

(21) Appl. No.: 12/066,249

(22) PCT Filed: Sep. 10, 2006

(86) PCT No.: PCT/IL2006/001052
§ 371 (c)(1),
(2), (4) Date: Sep. 3, 2008

(87) PCT Pub. No.: WO2007/029260
PCT Pub. Date: Mar. 15, 2007

(65) Prior Publication Data
US 2008/0316585 A1      Dec. 25, 2008

Related U.S. Application Data

(60) Provisional application No. 60/715,695, filed on Sep. 8, 2005.

(51) Int. Cl.
*G02B 6/26* (2006.01)
(52) U.S. Cl. ............... 385/18; 385/11; 385/16; 385/24; 385/37
(58) Field of Classification Search ............ 385/11, 385/16, 18, 24, 37, 39
See application file for complete search history.

(56) References Cited

U.S. PATENT DOCUMENTS

| | | | | |
|---|---|---|---|---|
| 6,795,182 | B2 * | 9/2004 | Rakuljic et al. | 356/328 |
| 6,947,628 | B1 | 9/2005 | Peng et al. | |
| 7,058,251 | B2 * | 6/2006 | McGuire, Jr. | 385/16 |
| 7,092,599 | B2 | 8/2006 | Frisken et al. | |
| 7,251,410 | B2 * | 7/2007 | Ide | 385/140 |
| 2002/0176151 | A1 | 11/2002 | Moon et al. | |
| 2004/0136718 | A1 | 7/2004 | McGuire | |
| 2005/0100277 | A1 | 5/2005 | Frisken | |
| 2006/0067611 | A1 | 3/2006 | Frisken et al. | |

FOREIGN PATENT DOCUMENTS

| | | |
|---|---|---|
| WO | WO 03/005621 | 1/2003 |
| WO | WO 2005/052507 | 6/2005 |

* cited by examiner

*Primary Examiner*—Hemang Sanghavi
(74) *Attorney, Agent, or Firm*—Fish & Richardson P.C.

(57) ABSTRACT

A fiber-optical, wavelength selective switch, especially for channel routing with equalization and blocking applications. The input signals are converted to light beams having predefined polarizations (41). The beams are then laterally expanded (43), and then undergo spatial dispersion in the beam expansion plane. The different wavelength components are directed through a polarization rotation device, pixilated along the wavelength dispersion direction such that each pixel operates on a separate wavelength. Each beam is passed into a pixilated beam steering array (48), for directing each wavelength to a desired output port. The beam steering devices can be MEMS-based or Liquid crystal-based, or an LCOS array. When the appropriate voltage is applied to a pixel and its associated beam steering element, the polarization of the light passing through the pixel is rotated and the beam steered to couple to the selected output port.

42 Claims, 13 Drawing Sheets

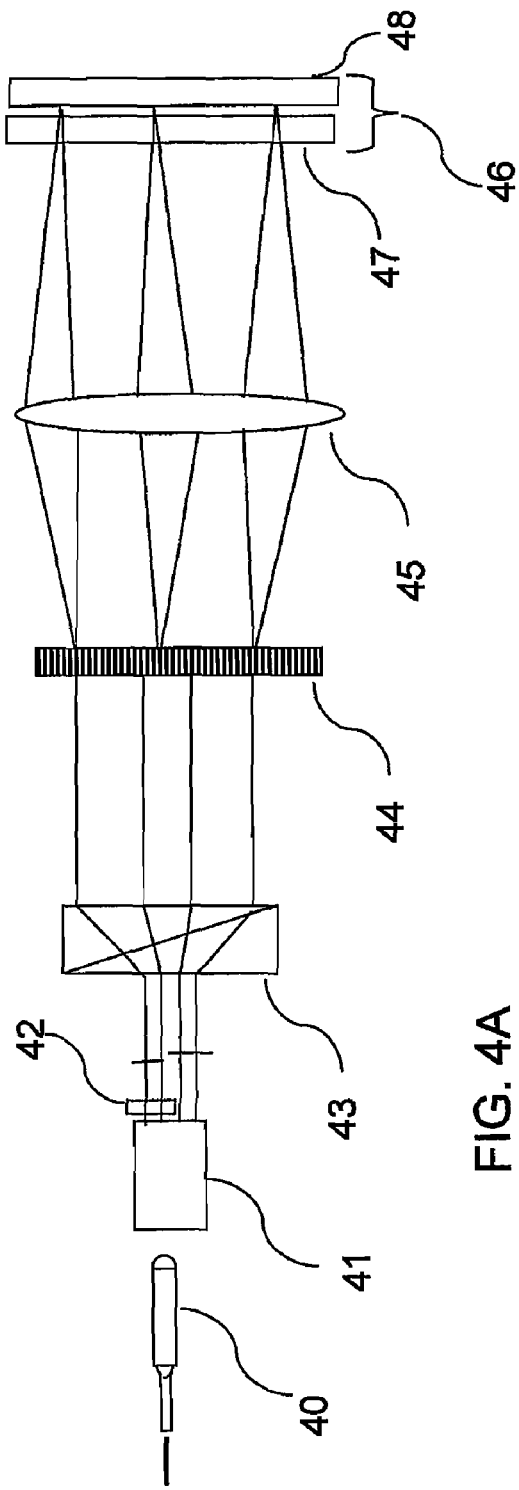
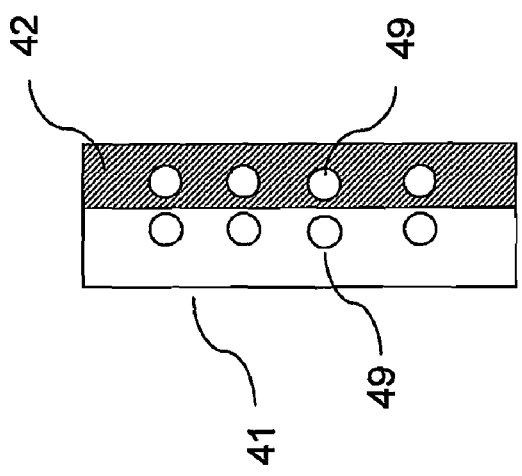
FIG. 4A
FIG. 4B

OPTICAL WAVELENGTH SELECTIVE ROUTER

This application is the U.S. national phase of International Application No. PCT/ IL2006/001052 filed Sept. 10, 2006, which claims priority from U.S. Provisional Application No. 60/715,695, filed Sept. 8, 2005. The International Application was published in English on Mar. 15, 2007 as WO 2007/029260 A under PCT Article 21(2).

FIELD OF THE INVENTION

The present invention relates to the field of fast optical switches, whose operation is wavelength dependent, especially for use as a wavelength selective router or channel blocker in an optical communication system.

BACKGROUND OF THE INVENTION

It is known in the field of optical communications to use optical wavelengths as optical carriers for carrying digital or analog information. Also, the different wavelengths may be used to discriminate one set or channel of information from another. When a plurality of wavelengths are coupled or multiplexed onto a single fiber, this is called wavelength division multiplexing (WDM). Use of such WDM increases the overall bandwidth of the system.

There is a need in such systems to switch packets of optical information passing along one fiber to any of a number of other fibers, according to the wavelength of the optical signal. Such a switch is known as an optical router or a wavelength selective switch. A number of wavelength dependent switches and routers exist in the prior art. In co-pending PCT Applications. PCT/IL2002/00511, PCT/IL2003/01002 and PCT/IL2006/00590, all hereby incorporated by reference, each in its entirety, there are disclosed wavelength selective switches wherein an input optical signal is spatially wavelength-dispersed and polarization-split in two preferably perpendicular planes. The wavelength dispersion is preferably performed by a diffraction grating, and the polarization-splitting by a polarized beam splitter. A polarization rotation device, such as a liquid crystal polarization modulator, pixelated along the wavelength dispersive direction such that each pixel operates on a separate wavelength channel, is operative to rotate the polarization of the light signal passing through each pixel, according to the control voltage applied to the pixel. The polarization modulated signals are then wavelength-recombined and polarization-recombined by means of similar dispersion and polarization combining components as were used to respectively disperse and split the input signals. At the output polarization recombiner, the direction in which the resulting output signal is directed is determined by whether the polarization of the particular wavelength channel was rotated by the polarization modulator pixel, or not. PCT Application Nos. PCT/IL2003/01002 and PCT/IL2006/00590 also incorporate lateral expansion of the polarized beams in the plane of the dispersion.

Such fast, wavelength selective, optical switch structures are capable of use in WDM switching applications, but are generally limited to 2×2 configurations, for use as channel blockers or attenuators. In U.S. Pat. No. 7,092,599 to S. J. Frisken for "Wavelength Manipulation System and Method", there is described a wavelength manipulation system using an LCOS phased array, with an optical arrangement including a spherical mirror and a cylindrical lens for maintaining collimation of the input beams in the direction of dispersion, and for focusing of the input beams in the direction perpendicular to the direction of dispersion. In published U.S. Patent Application No. 2006/0067611 for "Wavelength Selective Reconfigurable Optical Cross Connect", there is described an optical coupling device using an LCOS phased array, with an optical arrangement including at least a cylindrical mirror and a cylindrical lens.

There therefore exists a need for a new optical, multi-pole, multi-way wavelength selective switch structure having a simple optical structure, for use in channel routing applications, with the addition of add and drop functionalities.

The disclosures of each of the publications mentioned in this section and in other sections of the specification, are hereby incorporated by reference, each in its entirety.

SUMMARY OF THE INVENTION

The present invention seeks to provide a new fiber-optical, multi-way, wavelength selective switch (WSS) structure, such as is used for channel routing and/or blocking applications in optical communication and information transmission systems. Add and drop functionality, from and to a number of ports, can also be implemented in this switch structure. The switch uses a minimum of components, and can thus be economically constructed for large scale use in such systems. The switch structure can also be used as a wavelength selective variable optical attenuator for any of the transfer routes therethrough.

The switch structure utilizes conversion, preferably by the use of birefringent crystals, of optical signals input to any port of the switch, to light beams having a defined polarization, preferably linear, and which are mutually disposed in a predetermined plane with respect to the system plane in which optical manipulation of the beam traversing the WSS is to be performed. This is followed by lateral expansion of the polarized beams in this predefined plane. This lateral expansion is preferably performed by means of a pair of anamorphic prisms, though any alternative method can be utilized, such as a cylindrical lens telescope system, or even a single prism, as is known in the art. The beam is then spatially wavelength-dispersed in the same predetermined plane as that of the beam expansion, preferably by means of a diffraction grating. Lateral expansion of the beam, combined with dispersion in the same plane as that of the lateral expansion provides the WSS with advantages compared to prior art switches, especially with respect to the reduction in switch height thus enabled, and with respect to the increased wavelength resolution thus enabled. The light is then directed through a polarization rotation device, preferably a liquid crystal (LC) cell pixelated along the wavelength dispersive direction, such that each pixel operates on a separate wavelength. When the appropriate control voltage is applied to a pixel, the polarization of the light signal passing through that pixel is rotated, thereby blocking, transmitting or attenuating the particular wavelength channel passing through that pixel.

After beam polarization rotation, the light passing through each pixel is angularly deflected using a beam steering element. The beam steering element is pixelated along the wavelength dispersive direction, such that each beam steering pixel also operates on a separate wavelength. When the appropriate control voltage is applied to a beam steering pixel, the wavelength component associated with that liquid crystal pixel is steered by the beam steering pixel towards its desired direction. The beam can be steered either in the plane of the wavelength dispersion, conventionally called the horizontal direction of the switch structure, or perpendicular thereto, known as the vertical direction of the switch structure. Perpendicular steering has an advantage in that the angular deviation generated by the beam steering does not interfere with the angular deviation generated by the wavelength dispersion, thus simplifying construction.

The steering of the beam through each individual pixel enables light of different wavelengths, after being transmitted or attenuated, to be directed to different output ports, according to the various paths defined by the beam steering angles. Additionally, the light of a specific wavelength can be blocked, in which case the beam steering is unused.

The wavelength dispersed, steered beams from the polarization rotation pixels are then recombined, followed by beam contraction and passage back through an output birefringent crystal towards the switch outputs. The wavelength selective switch can be reflective, in which case the steered beams are returned through the same device as was used to disperse the multiwavelength input beams, through the same lateral beam expander that was used to laterally expand the input beams, and through the same polarization manipulator that was used on the input beams. Because of the beam steering of the present invention, each angularly displaced, steered beam passes through these components at a slightly displaced location, depending on the beam steering angle, and an array of output collimators is disposed at the end of the output birefringent crystal to collect each steered beam at a separate output port according to the steered beam angle. Alternatively and preferably, the WSS can be transmissive, in which case the steered beams are output from the device through separate dispersive elements, beam contracting elements and polarization manipulation elements.

The WSS of the present invention has a significant advantage over prior art switches, in that the polarization rotation element can be operated in co-operation with the beam steering device in such a manner that the steered beam is prevented from coupling into any output ports other than its destined output port. This is achieved by adjusting the transmissivity of the polarization rotation device in the pathways to undesired output ports, such that output to them is blocked as the steered beam passes over them. In this way, a hit-less switching configuration can be achieved using only a one-dimensional steering array.

The beam steering elements can be any miniature element which is capable of deviating the path of the beam impinging thereon. According to one preferred embodiment, an array of Micro-Electro-Mechanical System (MEMS) components, such as micro-mirrors, are used to generate the steering. The angle of deviation of such MEMS elements can be controlled electronically to provide the desired beam steered angle.

Alternatively and preferably, the beam steering can be performed by utilizing a set of serially disposed liquid crystal arrays and prismatic polarization separators, such as wedge shaped birefringent walk-off crystals, which generate different angles of propagation to the beam passing therethrough, according to the different polarizations of the beams produced by the setting of the liquid crystal array pixels. The steered angle of a beam passing through a particular liquid crystal pixel is determined by the polarization rotation setting of each of the serial LC pixels through which the beam passes. This embodiment has the advantage of generating the beam steering without any moving parts, but the disadvantage of a more complex control system and possibly higher cross-talk between channels.

According to a further preferred embodiment, the beam steering can be generated by use of a liquid crystal-on-silicon (LCOS) spatial light modulator acting as a phased array. In an LCOS device, the light is passed through a pixilated layer of liquid crystal material layer disposed over a reflective substrate formed on the front of a CMOS substrate, on which is implemented a circuit array for driving the various pixels of the LC layer between their states. According to these states, the light traverses each pixel either undeflected, and is reflected back along its incident path, or is deflected and thus reflected back along a different path to a different optical port from that by which it reached the LCOS pixel. The pixels on such a device are generally so small that each wavelength component covers a number of pixels, even with the smallest optical dimensioning practical. The complete 2-dimensional LCOS array is then programmed to direct the various wavelength components of the input channels to the directions desired for each wavelength according to the phase shifts applied to the various pixels in the LC pixels for each wavelength.

In all of the preferred WSS embodiments of the present invention, the operation of the device is essentially reciprocal, such that signals for switching can be input at what has been described in this application as "output" ports, and conversely, can be output at what has been called "input" ports. It is therefore to be understood that the terms input and output in this application can be used interchangeably, and are also thuswise claimed, and that the invention is not intended to be limited by the directional nomenclature of a particular port. Wherever a particular port is to be used for input or output, it is to be understood that a signal separation device such as a circulator has to be used to separate the input from the output directional signals.

The channel switching rate is determined by the slower of the switching rates of both the LC blocking/transmitting/attenuating element, and of the beam steering device, since the beam must be processed by both. In either the case of MEMS or of LC beam steering, the rate achievable is suitable for use in WDM or DWDM switching applications.

There is therefore provided, according to a first preferred embodiment of the present invention, a wavelength selective switch (WSS) comprising:

(i) at least a first port for inputting at least a first multi-wavelength optical signal, (ii) a plurality of output ports for outputting different wavelength components of the at least first multi-wavelength optical signal, (iii) a polarization transformation device for converting each of the at least first multi-wavelength optical signals into a pair of multi-wavelength optical beams disposed in a predetermined plane and having the same predefined polarization, (iv) a beam expanding device for laterally expanding the multi-wavelength optical beams of predefined polarizations in the predetermined plane, (v) a wavelength dispersive element receiving the laterally expanded optical beams of predefined polarizations and dispersing wavelength components thereof in the predetermined plane, (vi) a polarization rotation element, pixilated generally along the direction of the dispersion, adapted to rotate the polarization of light passing through pixels thereof according to control signals applied to the pixels, such that the polarization of at least one wavelength component of the dispersed optical beams is rotated according to the control signal applied to the pixel through which the at least one wavelength component passes, and (vi) a pixilated beam steering element disposed such that the at least one wavelength component passing through a pixel of the polarization element is steered towards its desired output port according to the settings of the pixel of the beam steering device associated with the at least one wavelength component.

In the above described WSS, the at least one wavelength component is preferably attenuated in accordance with the control signal applied to the pixel of the polarization rotation element associated with the at least one wavelength component. The beam steering element may be any of an array of Micro Electro-Mechanical System (MEMS) mirrors, each mirror of the array having a single axis of rotation, or a Liquid Crystal on Silicon (LCOS) array, or a sequence of pairs of adjustable polarization rotation elements and birefringent prisms, wherein the at least one wavelength component is steered in accordance with the settings of the adjustable polarization rotation elements through which the at least one wavelength component passes.

In accordance with still another preferred embodiment of the present invention, any of the above described switches may preferably further comprise at least one optical element for focusing the dispersed wavelength components of the expanded light beams onto the beam steering element. This focusing may be performed by a lens, or by use of a wavelength dispersive element also having optical focusing power.

Additionally, in the above described WSS's, the polarization rotation element may be a liquid crystal element; the polarization transformation device may be a birefringent walk-off crystal with a half-waveplate disposed on part of its output face; the beam expanding device may be any one of a pair of anamorphic prisms, a cylindrical lens telescope system, and a single prism; and the wavelength dispersive element may be a diffraction grating.

In the above-described embodiments using a MEMS array, the pixel of the polarization rotation element associated with the at least one wavelength component may be preferably controlled to block the passage of the at least one wavelength component during switching, at least when the at least one wavelength component crosses a path to an undesired output port.

According to a further preferred embodiment, the pixilated beam steering element, of whatever type, is adapted to steer the at least one wavelength component in a direction such that the steered wavelength component does not cross the path of any other undesired wavelength component.

There is further provided in accordance with still another preferred embodiment of the present invention, a WSS as described above, and also comprising a beam demagnifier disposed such that the dimensions of the multi-wavelength optical beams are reduced in the direction perpendicular to the plane of dispersion.

Furthermore, in any of the above-described embodiments, the pixilated beam steering element may either be a reflective element, such that the steered beam accesses its destined output port through those optical components used to direct the optical signal from the input port to the beam steering element, or it may be a transmissive element, such that the steered beam accesses its destined output port through additional optical components which direct the optical signal from the beam steering element to the output port.

Additionally, any of the above-described embodiments may further comprise a beam monitoring array for determining the signal level in any port.

In accordance with still another preferred embodiment of the present invention, there is further provided a wavelength selective switch comprising:

(i) at least a first port for inputting at least a first multi-wavelength optical signal, (ii) a plurality of output ports for outputting different wavelength components of the at least first multi-wavelength optical signal, (iii) a polarization transformation device for converting each of the at least first multi-wavelength optical signals into a pair of multi-wavelength optical beams disposed in a predetermined plane and having the same predefined polarization, (iv) a beam expanding device for laterally expanding the multi-wavelength optical beams of predefined polarizations in the predetermined plane, (v) a wavelength dispersive element receiving the laterally expanded optical beams of predefined polarizations and dispersing wavelength components thereof in the predetermined plane, and (v) a beam steering element comprising a pixilated Liquid Crystal on Silicon (LCOS) array, the LCOS array being configured to direct different ones of the wavelength components to output ports in accordance with control signals applied thereto. The pixilated LCOS array may preferably be configured to attenuate different ones of the wavelength components in accordance with the control signals applied thereto.

Any of the above described WSS's incorporating an LCOS array, preferably further comprises a beam deflecting element adapted to increase the steered beam deflection angle. This beam deflecting element may be any one of a diffractive optical element, a holographic element, a sequential series of reflecting surfaces, and a divergent prism assembly.

There is further provided in accordance with still another preferred embodiment of the present invention, a wavelength selective switch comprising:

(i) at least a first port for inputting a multi-wavelength optical signal, (ii) a plurality of output ports for outputting different wavelength components of the multi-wavelength optical signal, (iii) a beam expanding device for laterally expanding at least one beam generated from the multi-wavelength optical beams in a predetermined plane, (iv) a wavelength dispersive element receiving the at least one laterally expanded optical beam and dispersing wavelength components thereof in the predetermined plane, (v) a pixilated beam attenuating array operating on the dispersed wavelength components, and (vi) a pixilated beam steering element adapted to steer at least one of the dispersed wavelength components towards a desired output port, wherein the pixilated beam attenuating array is operated in co-operation with the beam steering device in such a manner that the steered beam is prevented from coupling into any output ports other than its desired output port.

In such a WSS, the pixilated beam attenuating array may preferably be controlled to block transmission of the steered beam during switching, at least while it traverses the paths to output ports other than the desired output port.

In accordance with still another preferred embodiment of the present invention, there is further provided a method of switching selected wavelength components of a multi-wavelength input optical signal to a desired output port, the method comprising the steps of:

(i) generating at least one beam from the multi-wavelength input optical signal (ii) laterally expanding the at least one multi-wavelength optical beam in a predetermined plane, (iii) spatially dispersing in the predetermined plane the at least one multi-wavelength optical beam to generate wavelength components thereof, (iv) providing a pixilated beam attenuating array to attenuate the dispersed wavelength components, and (vi) steering at least one of the dispersed wavelength components towards a desired output port, wherein the steering is performed in co-operation with the attenuation in such a manner that the steered beam is prevented from coupling into any output ports other than its desired output port.

According to this method, the pixilated beam attenuating array may preferably be controlled to block transmission of the at least one steered wavelength component during switching, at least while it traverses the paths to output ports other than the desired output port.

In accordance with a still further preferred embodiment of the present invention, there is also provided a method of switching selected wavelength components of at least one multi-wavelength input optical signal to a desired output port, the method comprising the steps of:

(i) transforming the polarization of each of the at least one multi-wavelength optical signals into a pair of multi-wavelength optical beams having predefined polarizations, (ii) laterally expanding the multi-wavelength optical beams of predefined polarizations in a predetermined plane, (iii) spatially dispersing in the predetermined plane, the laterally expanded, multi-wavelength optical beams into a series of spatially separated wavelength beams, (iv) utilizing a polarization rotation element, pixilated generally along the direction of the dispersion, for rotating the polarization of light passing through pixels thereof according to control signals applied to the pixels, such that the polarization of at least one wavelength component of the dispersed optical beams is rotated according to the control signal applied to the pixel through which the at least one wavelength component passes, and (v) steering the at least one wavelength component passing through a pixel of the polarization element, by use of a pixelated beam steering device, towards its desired output port according to the settings of the pixel associated with the at least one wavelength component, of the beam steering device.

There is further provided in accordance with yet more preferred embodiments of the present invention, the above described method, modified by the incorporation of any of the adaptations, additions or limitations described in relation to the WSS embodiments described immediately hereinabove.

BRIEF DESCRIPTION OF THE DRAWINGS

The present invention will be understood and appreciated more fully from the following detailed description, taken in conjunction with the drawings in which:

FIGS. 4A and 4B are more schematic views of the reflective wavelength selective router of FIG. 3, showing the component parts in more detail;

DETAILED DESCRIPTION OF PREFERRED EMBODIMENTS

Figure 1:
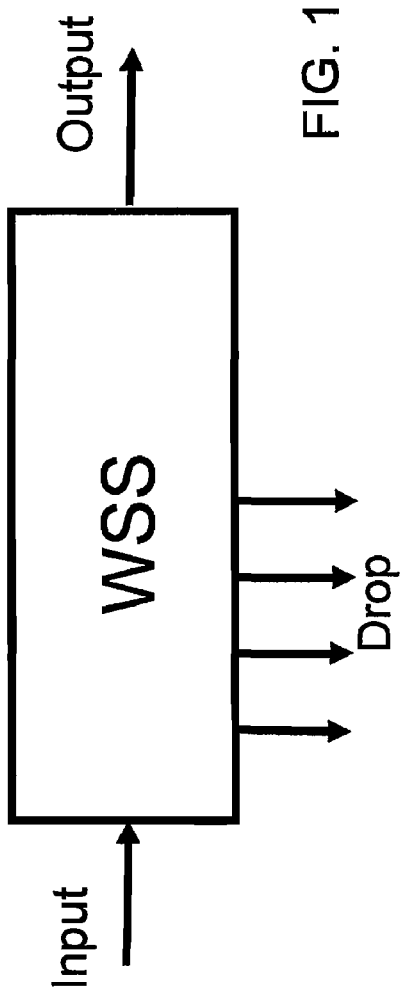
FIG. 1 illustrates schematically a block diagram of the functionality of an optical wavelength router according to a first preferred embodiment of the present invention.

Reference is now made to FIG. 1, which illustrates schematically a block diagram of the functionality of an optical wavelength router, including a single input port, a single main output port and a number of Drop ports. The function of the router is to either transmit, to block or to attenuate any wavelength channel in the input signal, and to direct that signal, if transmitted or attenuated, to any of the output or Drop ports.

Figure 2:
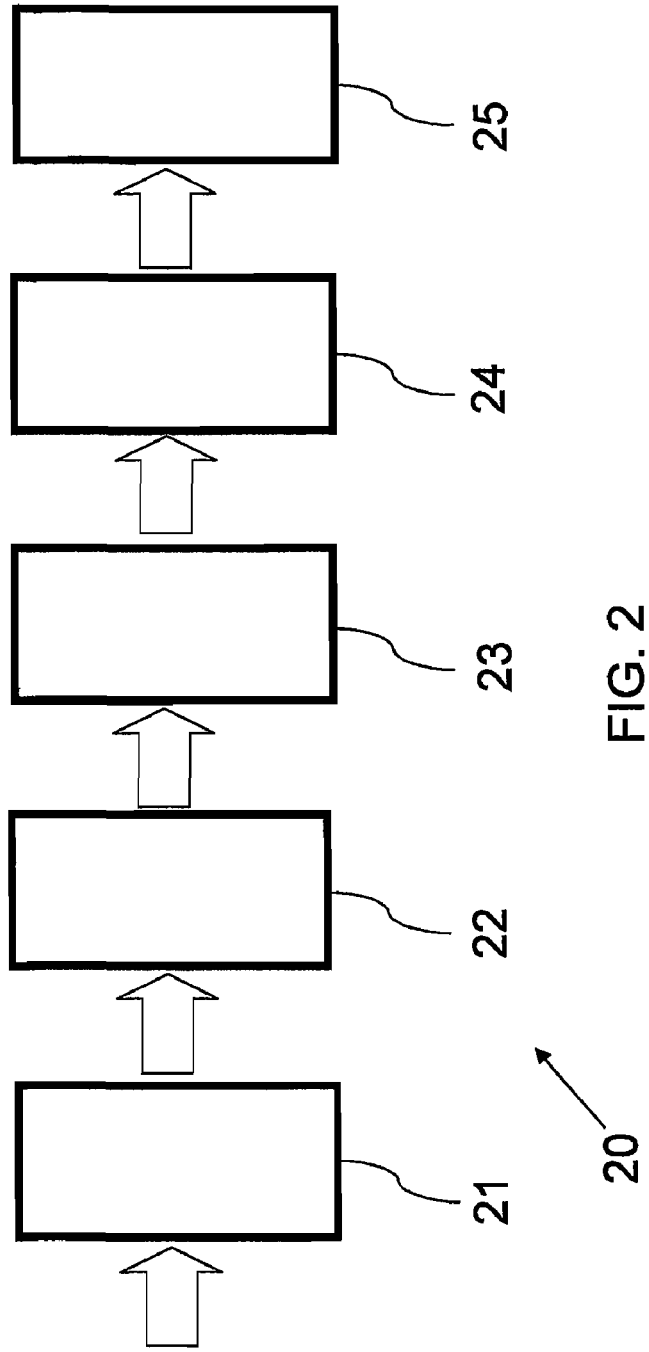
FIG. 2 illustrates schematically the structure of a reflective embodiment of FIG. 1, using beam steering.

Reference is now made to FIG. 2, which illustrates schematically the router 20 of FIG. 1, as implemented according to a preferred embodiment of the present invention, in the form of a block diagram of the functionality of the separate operative parts of the router. The signals are input to the router through a Fiber Interface Block 21, which accepts the input signals and converts them into free-space beams for polarization processing, lateral expansion and spatial manipulation. According to a preferred embodiment of the present invention, the free-space beams are first polarization processed in the polarization selection module 22, to generate pairs of beams mutually disposed in a predetermined plane, with like polarization, and then spatially expanded in that plane by means of a beam expander block, 23, by one of the methods known in the art. The spatially expanded beams are then dispersed in that plane in a Dispersion Optics Module, 24. Finally, the dispersed beam wavelength components are directed onto a Focal Plane Beam Steering Module 25, which incorporates a pixilated LC array for selecting the optical transmissibility applied to each wavelength channel, and a pixilated beam steering array which directs each wavelength channel in the selected direction according to which output or Drop port is to be selected for each wavelength channel. The dispersed beam wavelength components are preferably directed onto the Focal Plane Beam Steering Module 25, by an element with positive optical power, which can either be a separate focusing element such as a lens, or can be implemented by use of a dispersion element also having optical focusing power.

FIG. 2 illustrates schematically the structure of a reflective embodiment of FIG. 1, in that after transmission processing and beam steering, each wavelength channel beam is returned by reflection in a reflective surface incorporated into the beam steering module 24, back through the Dispersion Optics Module 22 to the beam expander block 22, and to the Fiber Interface Block 21, which is operative, in addition to its input role, also to output the switched beams to their selected output fibers. Such a reflective arrangement provides the most cost-effective and compact embodiment of this invention. It is to be understood, however, that a transmissive embodiment based on the component parts of FIG. 2 is equally feasible, with the Dispersion Optics Module 23, the beam expander block 22, and the Fiber Interface Block 21 repeated in that order after the Beam Steering Module 24, i.e. to the right of it in FIG. 2. Such a transmissive embodiment is understood to be included in all of the generalized embodiments of the present invention, where the exact optical arrangement, i.e. transmissive or reflective, is not specified. Detailed descriptions of some reflective and transmissive embodiments are given hereinbelow.

Figure 3:
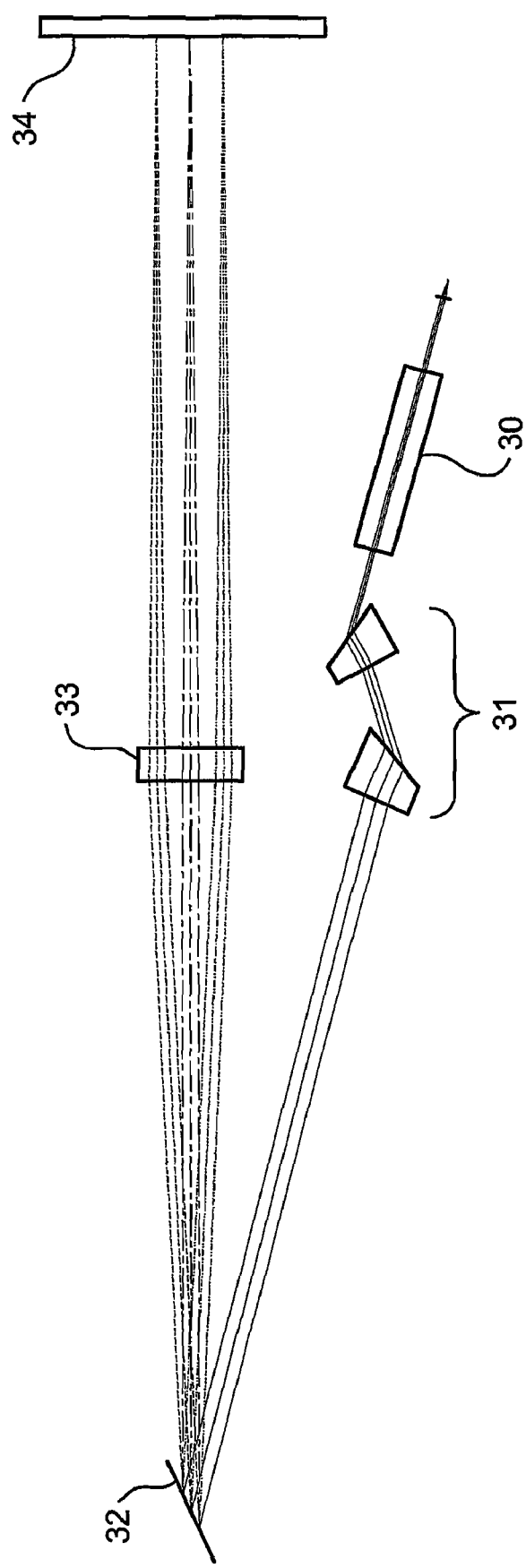
FIG. 3 is a schematic plan view, showing approximate component location and layout, of a reflective wavelength selective router, constructed and operative according to another preferred embodiment of the present invention.

Reference is now made to FIG. 3, which is a schematic plan view, showing preferred component location and layout of a reflective wavelength selective routing switch, constructed and operative according to another preferred embodiment of the present invention. The embodiment of FIG. 3 shows a fiber interface input/output block, which includes a polarization conversion device 30, such as a birefringent walk-off crystal with a half wave plate over part of its output. The like-polarization free-space beams thus generated are passed to a one dimensional beam expander 31, shown in this embodiment as a pair of anamorphic prisms, which are operative to expand the beams in the plane of the drawing. The expanded beams are then directed to a dispersive grating element 32, shown in this embodiment as a reflective grating, which disperses the wavelength components of each input beam in the same plane as that in which the beams were generated and expanded, namely, in the plane of the drawing paper, and a focusing lens 33 focuses the separated wavelength components onto the focal plane beam steering module 34, which is shown in more detail in the following drawings. It is to be understood that the wavelength selective router can equally be implemented in a transmissive embodiment, as explained hereinabove.

Reference is now made to FIG. 4A, which is another schematic plan view of the reflective wavelength selective router of FIG. 3, showing the component parts in more detail. FIG. 4A shows the plan view layout of a single channel path of the router. The input (or output) beam of each port is input (or output) at the fiber interface block, which preferably comprises a fiber collimator 40 per port, followed by a birefringent walk-off crystal 41, such as a $YVO_4$ crystal, preferably having a half wave plate 42 over part of its output face. The output of each channel thus comprises a pair of beams having the same polarization direction, as indicated by the vertical line on each of the beam outputs, and disposed in a predetermined plane, which, in the example shown in FIG. 4A, is in the plane of the drawing. After this polarization decomposition and conversion, these beams are then laterally expanded in that same predetermined plane, in the preferred example shown in FIG. 4A, by an anamorphic prism pair 43. These laterally expanded beams are passed to the grating 44 for wavelength dispersion, again in the same predetermined plane, which, in the example shown in FIG. 4A, is in the plane of the drawing. The dispersed wavelength components are then directed to the lens 45 for focusing on the beam switching and steering module 46. The beams of each wavelength channel are first switched by the pixilated liquid crystal (LC) array 47, to achieve the desired transmission state for that channel, either a blocked, or a fully transmitted or an attenuated transmission state. After the appropriate beam processing by the LC array, the beam is then passed to the beam steering device 48, shown in FIG. 4A as a reflective element, operative to reflect each switched and steered beam back down the router to the output positions of the birefringent crystal, and from there to the respective output collimator ports. This steering is performed in the direction perpendicular to the plane of the drawing. According to one preferred embodiment, the beam steering device may be a MEMS array of mirrors. The birefringent walk-off crystal 41 with its half-wave plate 42, is shown on a larger scale and in end view in FIG. 4B, where the beam positions can be seen after decomposition of each input beam into the two polarization-defined side-by-side beams 49.

In the embodiment shown in FIGS. 4A and 4B, the beam steering is performed out of the plane of the drawing of FIG. 4A, hence the vertical line of beams seen in FIG. 4B, one pair for each channel. As previously stated, a similar transmissive embodiment can equally be implemented, in which case the reflective elements 48 are replaced by a transmissive steering element embodiment, with the above mentioned input elements of the device repeated to the right of the beam steering device to deal with the outputting of the transmitted beams.

Figure 5A:
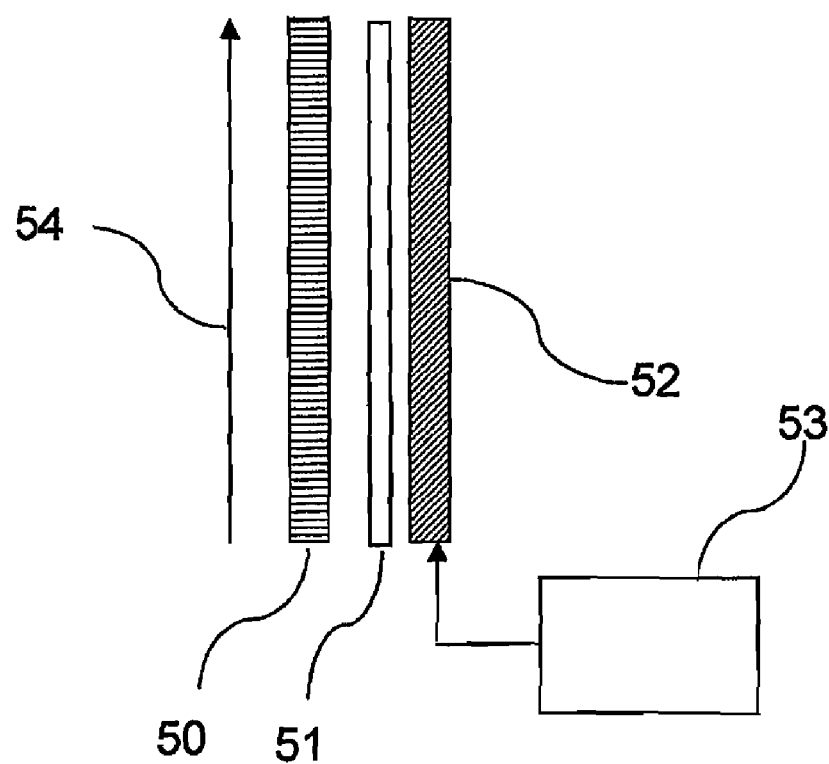
FIGS. 5A and 5B are schematic views from top and side of a MEMS based beam steering focal plane module for use in the router of FIG. 3.
Figure 5B:
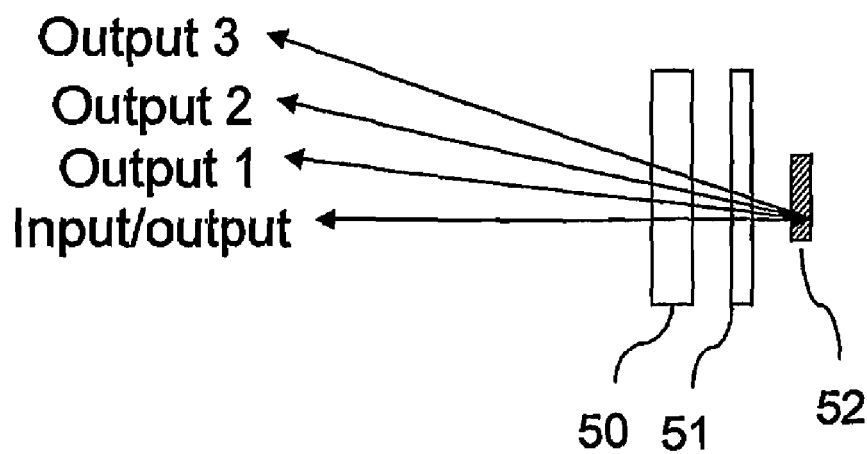

Reference is now made to FIGS. 5A and 5B, which are schematic views respectively from the top and side of a preferred embodiment of the beam steering focal plane module of the previous drawings, in the form of a MEMS array, for use with a single input channel of a WSS of the present invention. In FIG. 5A there are seen (i) the LC polarization rotation array 50, pixilated in the direction 54 of the wavelength dispersion, and responsible for selecting the desired transmissive, blocked or attenuated state of each wavelength channel, (ii) an optional linear polarizing element 51, whose function is to increase the extinction ratio of the polarization selection combination in the system, and thus to improve the blocking, and (iii) a one-dimensional MEMS array of mirrors 52, each of the MEMS mirrors being aligned directly behind a corresponding pixel of the LC array. The MEMS array mirrors reflectively steer the beam from each pixel back through that pixel, but at a steered angle out of the plane of the drawing, each pixel according to the setting of the MEMS control 53 for each mirror of the array.

FIG. 5B shows the same arrangement as that of FIG. 5A, but from a side view, i.e. looking along the dispersion direction, so that the different steering angles to the differently labeled output ports 1 to 3 can be shown. In the example shown in FIG. 5B, the input port, labeled I/O, can also be utilized as an output port by incorporation of a circulator at the input/output port of the router, as is known in the art. The additional three outputs shown can be used as Drop ports, though functionally, since they operate no differently from the input/output port shown, this is merely a matter of nomenclature, and the device is essentially reciprocal.

In the MEMS configuration illustrated in FIGS. 5A and 5B, a problem may arise during beam steering from one output to another because the MEMS element sweeps the beam into positions providing outputs where they are not requested. Thus for example, in FIG. 5B, when the beam of any particular wavelength is steered between outputs 1 and 3, it will momentarily cross output 2, generating a spurious signal therein.

Figure 5E:
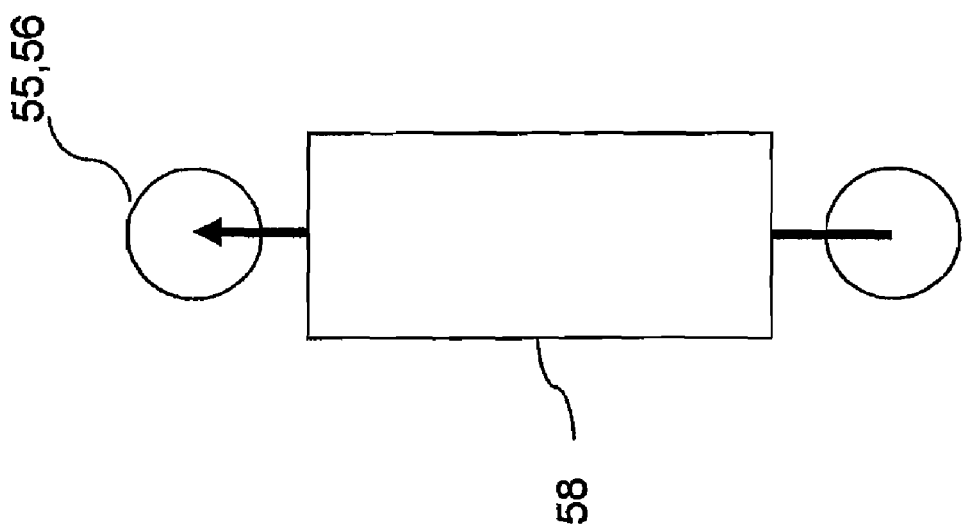
FIGS. 5C to 5E illustrate schematically another preferred embodiment of the present invention, providing a hitless beam steering configuration.
Figure 5D:
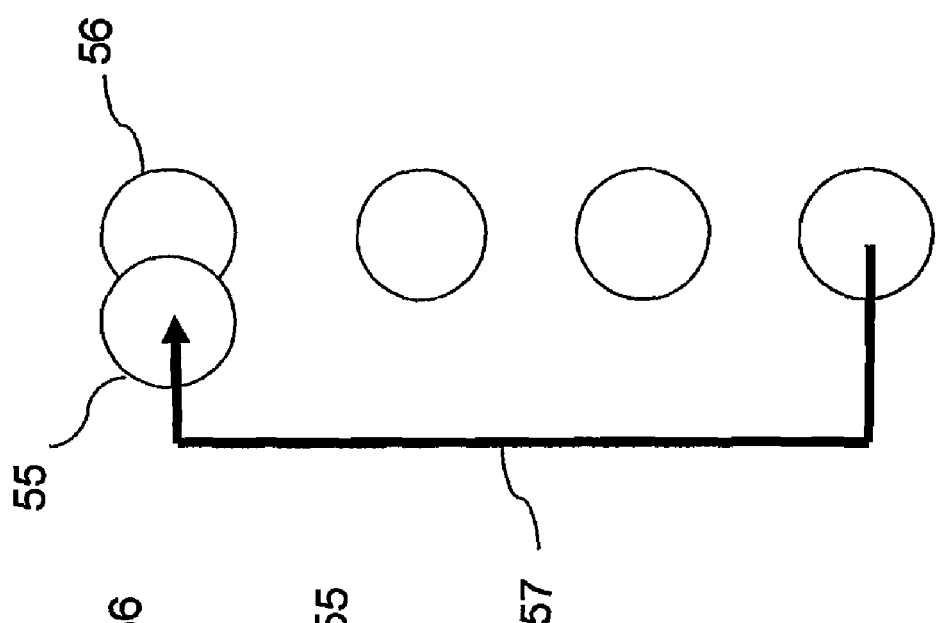
Figure 5C:
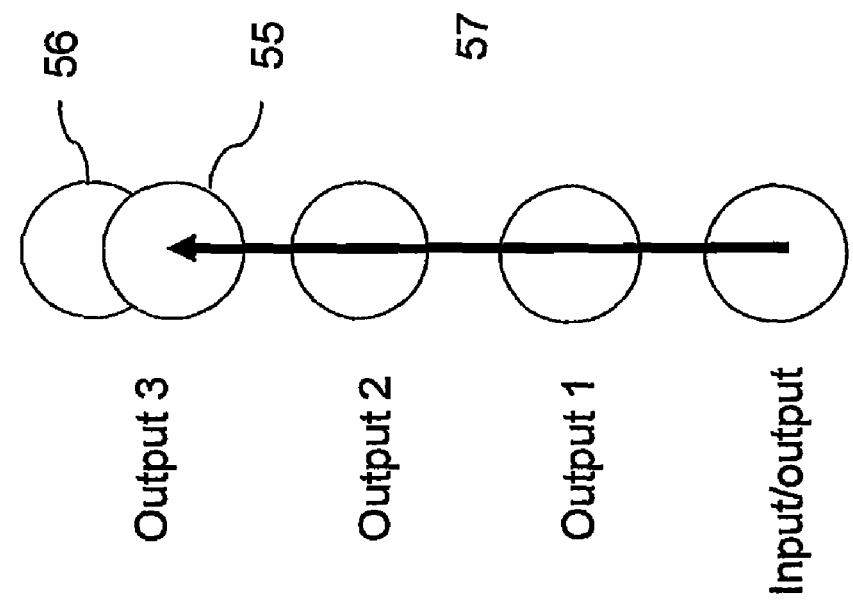

Reference is now made to FIGS. 5C to 5E which illustrate schematically another preferred embodiment of the present invention, which avoids this phenomenon, and provides what is known as a hitless beam steering configuration.

Referring first to FIG. 5C, which illustrates prior art switching methods, switching the beam from the port labeled input/output to output 3 involves traverse of output ports 1 and 2, with resulting spurious signals thereto. Furthermore, in such systems which utilize only single-direction beam steering, without the polarization rotation attenuation effects of the present invention, attenuation of the transmitted beam is achieved by directing the transmitted beam 55, so that it does not completely overlap the destination port 56, thereby coupling in only part of the signal. This, however, has the drawback that the band pass shape of the beam changes with the attenuation level.

Reference is now made to FIG. 5D, which illustrates a method by which prior art switches can overcome the problem of spurious signals. By using a two dimensional beam steering device, such as a MEMS mirror array having two axes of rotation for each mirror pixel, the beam can be deflected though a path 57 such that it will not illuminate in the direction of any other output port before reaching its target port 56. However, such a twin steered axis MEMS array is more costly to manufacture and incorporate, and more difficult to control, than a single steered axis MEMS array. Furthermore, when no polarization rotation attenuation is used, the same disadvantage arises as was described in connection with the embodiment of FIG. 5C.

Reference is now made to FIG. 5E, which illustrates a method by which the beam steering configuration of the WSS of the present invention, is able to overcome both of these drawbacks of prior art methods, and without forgoing the use of a simple one dimensional MEMS mirror array with single axis steering. In the configuration of FIG. 5E, the switched beam is steered directly between the input port and the destination port 56, but while the beam is passing over the intermediate ports during the switching process, the beam transmission is blocked by controlling the settings of the LC polarization rotation pixels associated with the particular wavelength component being switched. As soon as the switching process is over, and the beam path connection to the desired destination port is completed, the transmission can be unblocked and the switch can operate as programmed. The blocked paths to the undesired ports are shown schematically in FIG. 5E by the blocking patch 58. By this means, the problem of spurious signals can be overcome.

Furthermore, use of the polarization rotation attenuating elements of the present invention, allows the switched beam 55 to couple completely into its destination port 56, and any desired attenuation can be achieved by adjustment of the LC pixel setting to control the channel attenuation directly. In this way, the band pass shape distortion associated with the switching schemes of FIG. 5C and FIG. 5D is also avoided.

Figure 6A:
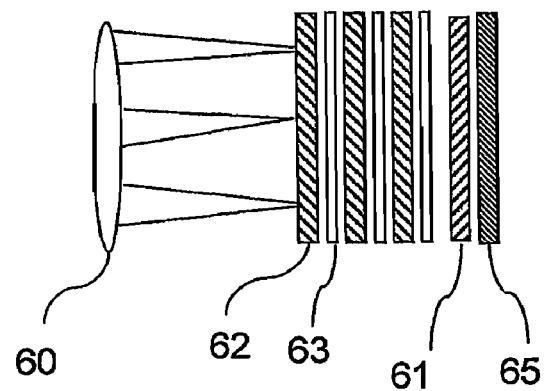
FIGS. 6A and 6B are schematic views from top and side of a liquid crystal/birefringent prism based beam steering focal plane module for use in the router of FIG. 3.
Figure 6B:
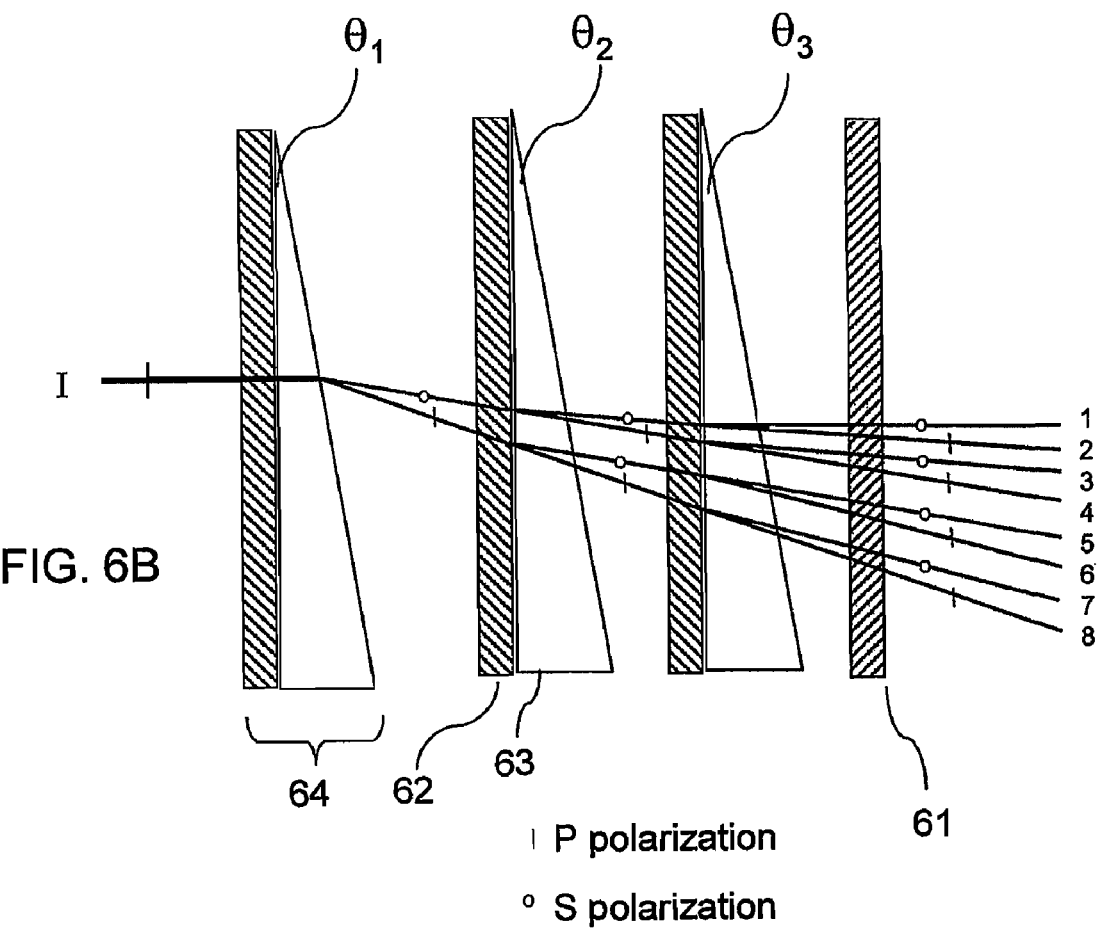

Reference is now made to FIGS. 6A and 6B, which are schematic views respectively from the top and side of an LC/birefringent-prism based beam steering focal plane module, constructed and operative according to a further preferred embodiment of the present invention. For illustrative purposes only, the FIG. 6A embodiment is shown as a reflective configuration, while that shown in FIG. 6B is transmissive, though it is to be understood that either configuration may be used as a reflective or transmissive embodiment. In FIG. 6A, there is shown the focusing lens 60 of the router directing the beams towards the focal plane switching and steering array. The switching function itself, namely the decision as to whether a particular wavelength channel is transmitted, attenuated or completely blocked, is preferably performed by the last LC element 61, which is pixilated, while the steering is performed using alternate pixilated LC crystals 62 and birefringent prismatic crystals 63, referred to hereinafter as LC/prism pairs, which are arranged serially in the beam paths. Each birefringent prismatic crystal deflects a beam impinging thereon by an angle which is dependent on whether the beam has s- or p-polarization, and the determination as to whether the beam impinging on a certain pixel has s- or p-polarization can be selected by applying the appropriate control voltage to the preceding LC pixel for that channel. Since each prism preferably selects one of two steering angles (assuming that the LC is driven to generate polarization rotations of 90°), then the number of possible steering angles becomes $2^n$, where n is the number of LC/prism pairs used in the router. Thus for three LC/prism pairs, 8-way steering is possible. In FIG. 6A, a mirror 65 is shown after the assembly to reflect the output beams back through the router.

In the plan view of the steering focal plane module of FIG. 6A, the beam deflection angles are into or out of the plane of the drawing, such that the differently directed beams are not discernible. Reference is now made to FIG. 6B, which is a schematic side view of the preferred transmissive LC/prism focal plane steering array shown in plan view in FIG. 6A, showing the different directions into which the module directs the input channel. Each of the three LC/prism pairs 64 can steer the beam into one of two different directions, depending on the beam polarization, such that 8 different steered directions are provided with the three stages shown. Birefringent prisms 63 rather than slabs are used in order to ensure that each of the birefracted beams is directed towards a different angle, ensuring channel separation between ports. Furthermore, each prism should preferably have a different wedge angle, $\theta_1$, $\theta_2$, $\theta_3$, to ensure compete angular separation of the steered beams from each stage, regardless of whether birefracted or not. The LC element 61 for selecting the switching status is preferably disposed either before or after (as shown in FIGS. 6A and 6B) the beam steering assembly, but not within the beam steering module, in order to avoid interference of the beam steering by the polarization changes caused by the switching element, which would cause channel cross-talk.

TABLE I

| Input | | After 1st LC | After 2nd LC | Output after $3^{rd}$ LC |
|---|---|---|---|---|
| P | Beam to port 1 | S | S | S |
| | Beam to port 2 | S | S | P |

Reference is now made to Table I, which shows the polarization states of outputs 1 and 2 of the preferred transmissive embodiment of FIG. 6B, for a situation where the switching LC 61 after the beam steering module is set to provide no additional polarization change in any output beam, i.e. all the beams are fully transmitted. For a p-polarization input beam, and for the illustrated settings of the LC beam steering cells shown in FIG. 6B, in which the p-polarization is deflected more than the s-polarization beam, the output at port 1 has an s-polarization, whereas that at port 2 has a p-polarization. Therefore, it is apparent that since the beam steering module generates polarization changes in the output signal polarizations, quite separately from the polarization changes engendered by the switching process LC, a low polarization dependent loss (pdl) grating must be used in these embodiments, to ensure that the dispersive element can handle beams of differing polarization. The outputs to the other ports 3 to 8 in Table I can be similarly displayed.

TABLE II

| Input | | After: | | | | Before: | | | Output |
|---|---|---|---|---|---|---|---|---|---|
| | | LC1 | LC2 | LC3 | | LC3 | LC2 | LC1 | |
| P | Beam to port 1 | S | S | S | MIRROR | S | S | S | P |
| | Beam to port 2 | S | S | P | MIRROR | P | S | S | P |

Reference is now made to Table II, which shows the polarization states of outputs 1 and 2 of the preferred reflective embodiment of FIG. 6A, again for a situation where the switching LC after the beam steering module is set to provide no additional polarization change in any output beam. For a p-polarization input beam, and for the same settings of the LC beam steering cells as those shown in FIG. 6B, the incident polarization at the mirror 65 for the beam destined for output port 1 is s-polarization, whereas that destined for port 2 has a p-polarization. However, since the beams are now reflected by the mirror, they return in a reverse path back to the input of the beam steering module, which is now the output of the beam steering module, and undergo the opposite polarization changes in the return path to those that they underwent in the incident path. As a result, each reflected output beam has the same polarization as that of the incident beam, and the beam steering module itself does not generate any polarization changes in the output signal polarizations. Thus for a fully transmitted signal, where the switching LC 61 does not introduce any other polarization changes, a high efficiency grating can be used to handle the like-polarized transmitted beams of all of the channels.

Figure 7A:
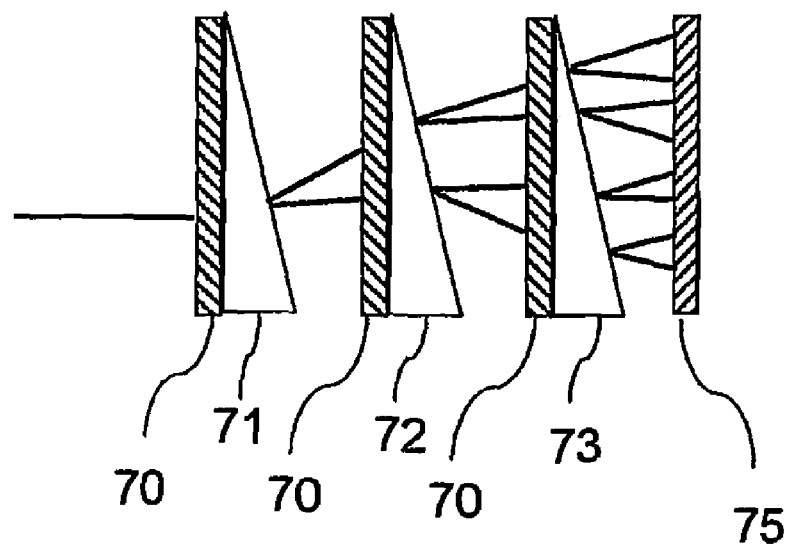
FIGS. 7A and 7B are schematic views of two transmissive beam steering modules, similar to those illustrated in FIG. 6B, but showing different wedge dispositions.
Figure 7B:
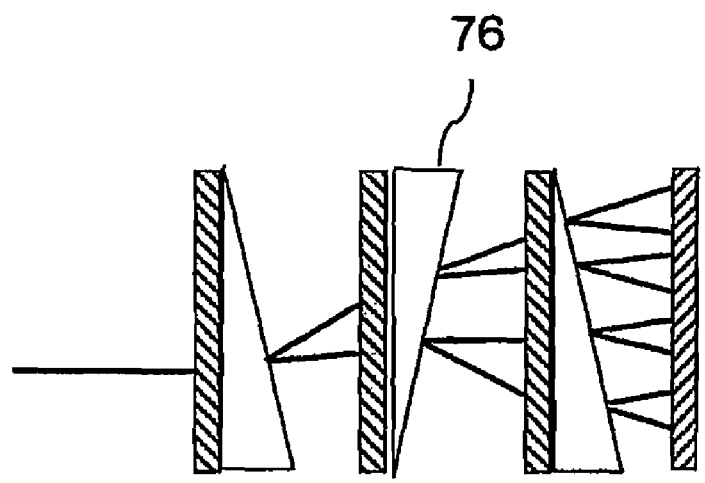

Reference is now made to FIGS. 7A and 7B, which are schematic views of two alternative and preferred transmissive beam steering modules, similar to those illustrated in FIG. 6B, having liquid crystal cells 70 with associated birefringent crystal prisms, 71, 72, 73, each prism having a different wedge angle, and a switching liquid crystal transmission element 74, but showing how, in FIG. 7B, the orientation of the wedge of the various prisms can be varied compared with that of FIG. 7A, without affecting performance. In the example shown in FIG. 7B, one of the prisms 76 is aligned such that it deviates the beams in the opposite direction to that of the other prisms. All that is required is that the chosen deflection angles should provide clear beam separation between output ports.

Figure 8A:
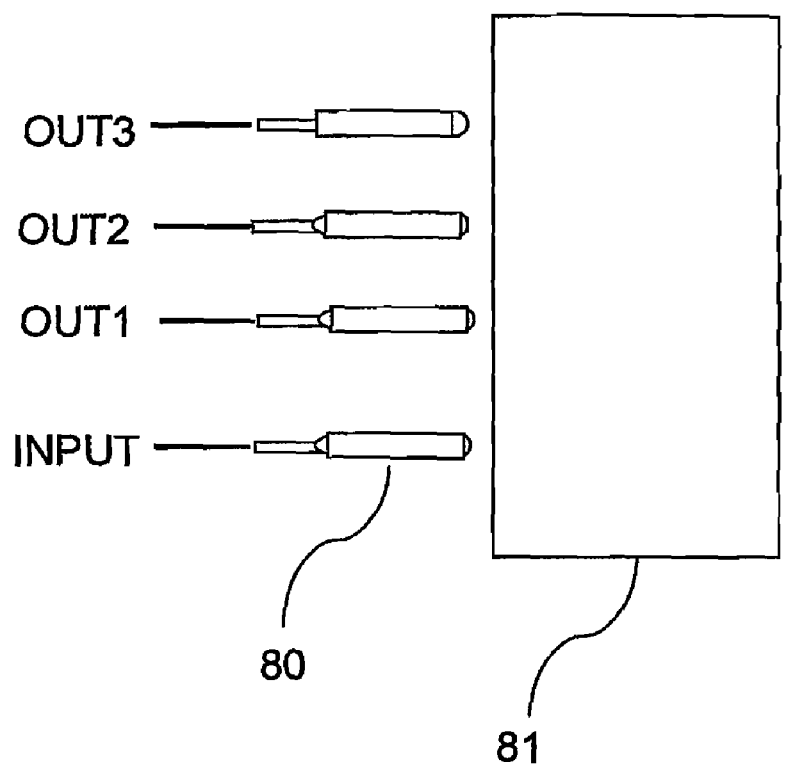
FIGS. 8A and 8B are schematic illustrations from side and front, of the fiber interface module of the router according to a preferred embodiment of the present invention.
Figure 8B:
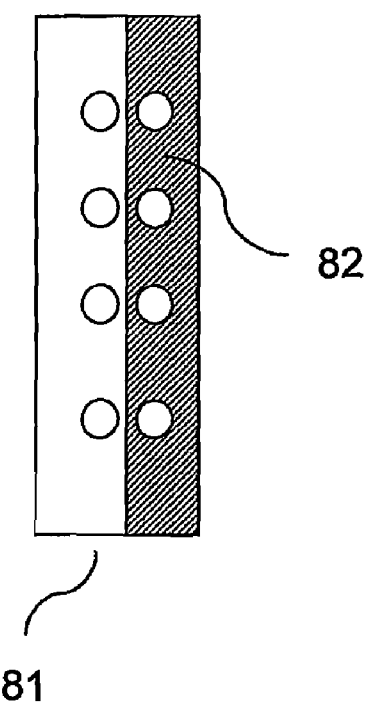

Reference is now made to FIGS. 8A and 8B, which are schematic illustrations of the fiber interface and polarization conversion module, according to a further preferred embodiment of the present invention. FIG. 8A is a side view, with the input and output fiber collimators 80 shown directing their beams at the birefringent polarization converter 81, which is preferably shown as a YVO$_4$ crystal. In FIG. 8B is shown a front view of the birefringent crystal 81, showing the array of beams exiting the birefringent crystal, a pair from each collimator, with a half wave plate 82 covering one side of the outputs of the birefringent crystal in order to rotate the polarization of one set of these output beams by 90° such that both beams of any port have the same polarization, as is known in the art.

Although the optical signals are schematically shown in FIG. 8A as being input or output from an array of single fiber collimators, it is to be understood that any other methods known in the art for inputting or outputting a plurality of signals can also be used in the present invention. An important feature of the input/output arrangement is that the optical channels be spaced as close as possible, in order to provide the most compact router as possible, with concomitant savings on component costs, and with increased packaging density for the routers in a communication system. Thus, it is possible to use a V-groove array to provide closer packing, either with a microlens array, or with a single lens for all of the inputs/outputs. Similarly, a waveguide input device can be used, in which the fiber inputs/outputs are brought closer together in a monolithic waveguide structure, such as can be fabricated in a silicon substrate. Even closer spacings can be achieved by this means.

Figure 9:
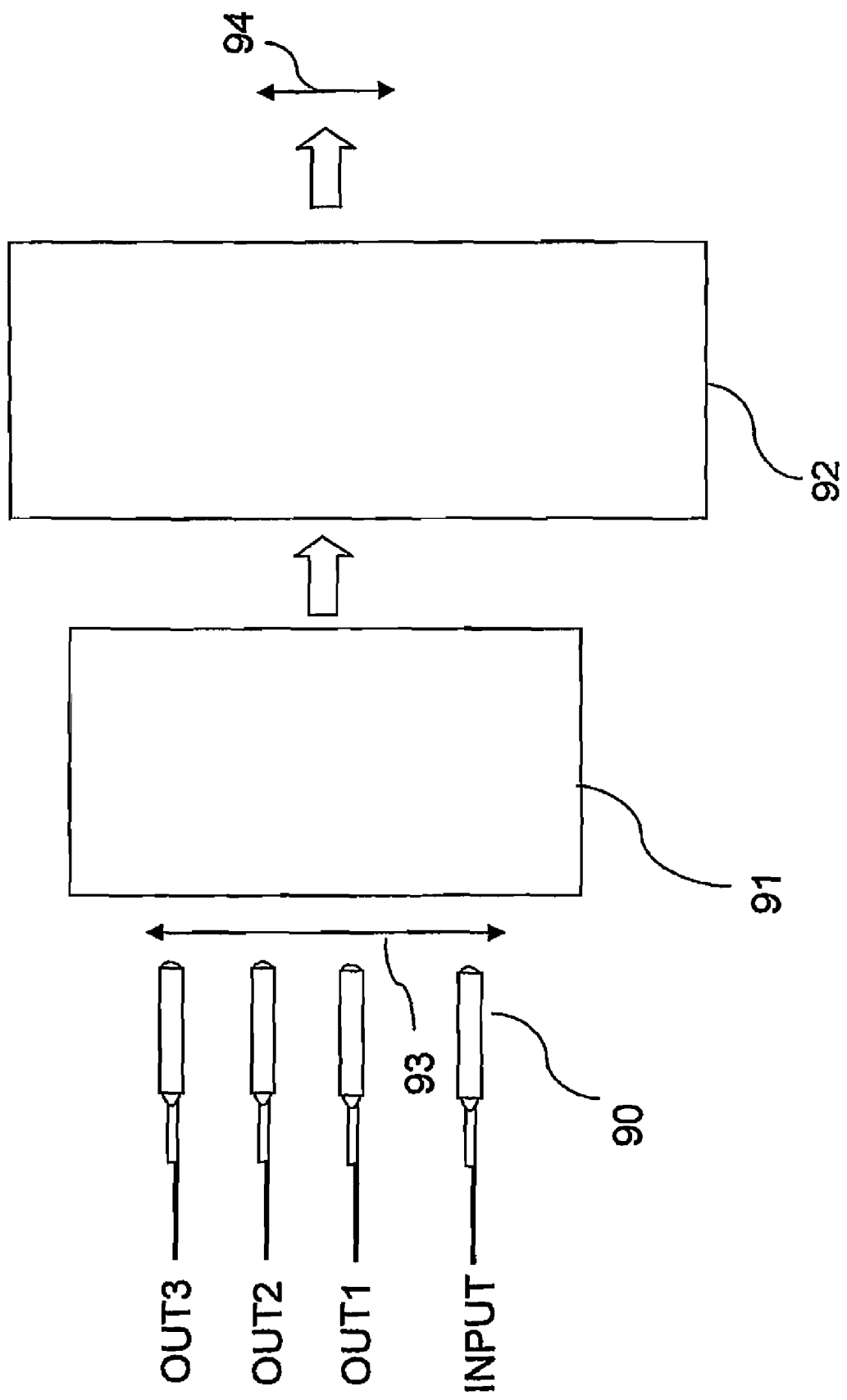
FIG. 9 is a schematic side view of the fiber interface input module shown in FIG. 8A, but including an inverse telescope for demagnifying the height of the array of input beams.

Reference is now made to FIG. 9, which is a schematic side view of the fiber interface input and polarization conversion module 90, 91, shown in FIG. 8A, but including an inverse telescope 92 for demagnifying the height of the array of input beams. This demagnification is in the plane generally orthogonal to that in which the lateral beam expansion takes place. Such demagnification is preferable used because the physical size of the input fiber collimators makes their spacing significantly larger than that required in the other optics modules of the router. The original height 93 of the beam array exiting and entering the collimator array 90 is reduced to a beam height 94 of significantly smaller dimensions for directing into the remainder of the router components, thus enabling the achievement of a more compact router geometry than would be achieved without such beam demagnification.

Figure 10:
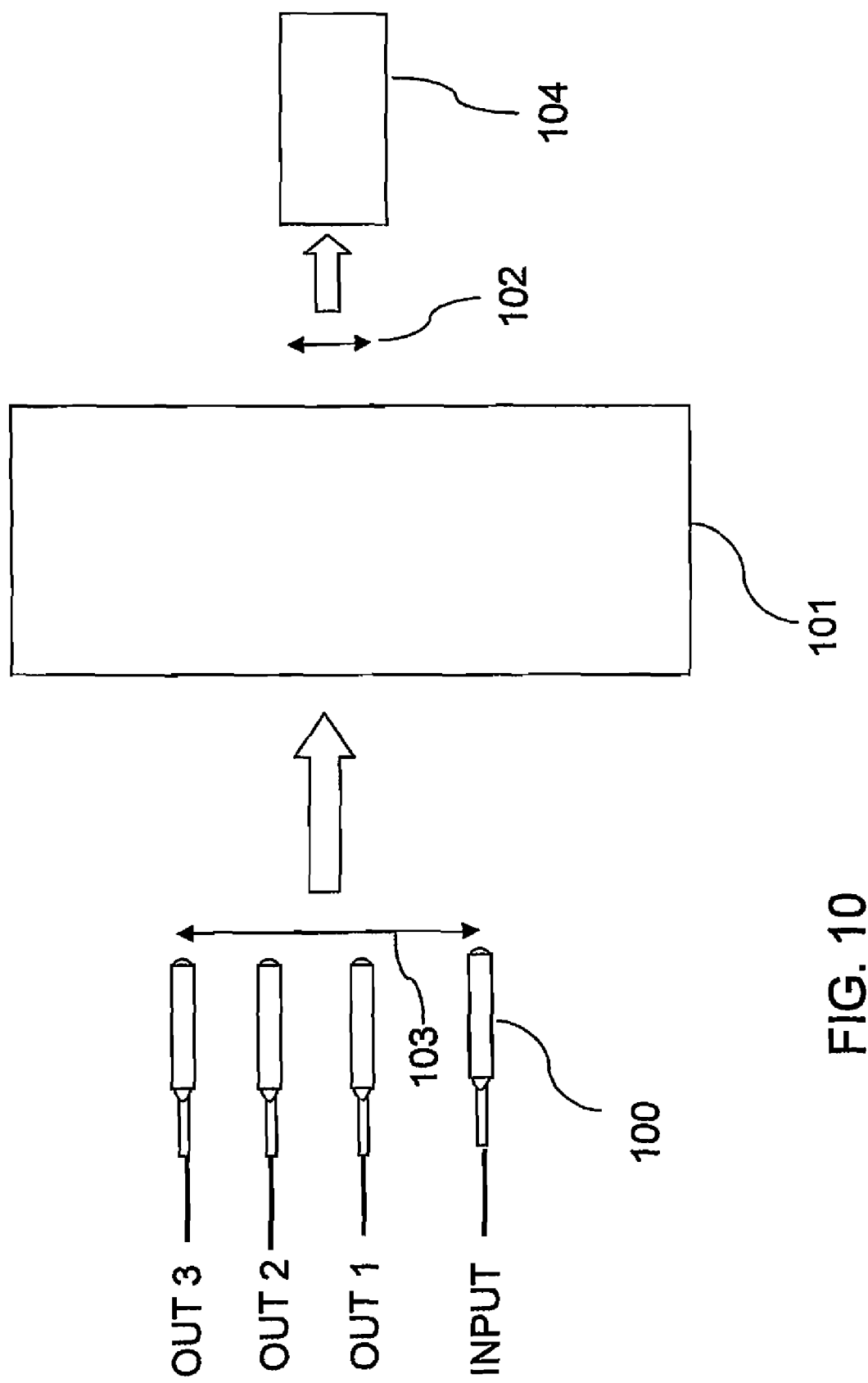
FIG. 10 is a schematic side view of an alternative configuration for the location of the inverse telescope of the fiber interface input module of FIG. 9.

Reference is now made to FIG. 10, which is a schematic side view of an alternative configuration of the fiber interface input module shown in FIG. 9. In this preferred embodiment, the inverse telescope 101 for demagnifying the height 103 of the beam array, is positioned before the input to the polarization conversion birefringent crystal 104, such that this crystal too, along with the rest of the router components, can have reduced height commensurate with the reduced height 102 of the demagnified beam.

Figure 11A:
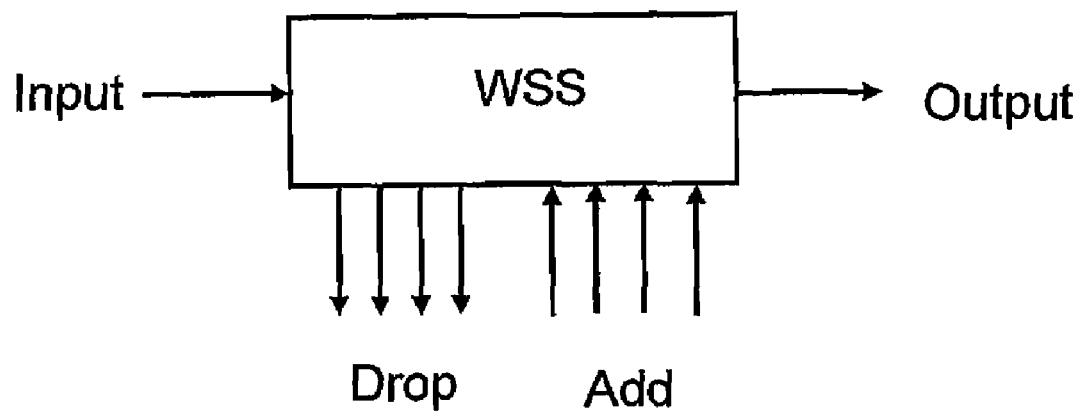
FIGS. 11A and 11B illustrate a schematic wavelength selective Add/Drop router module, constructed and operative according to a further preferred embodiment of the present invention, using beam steering.
Figure 11B:
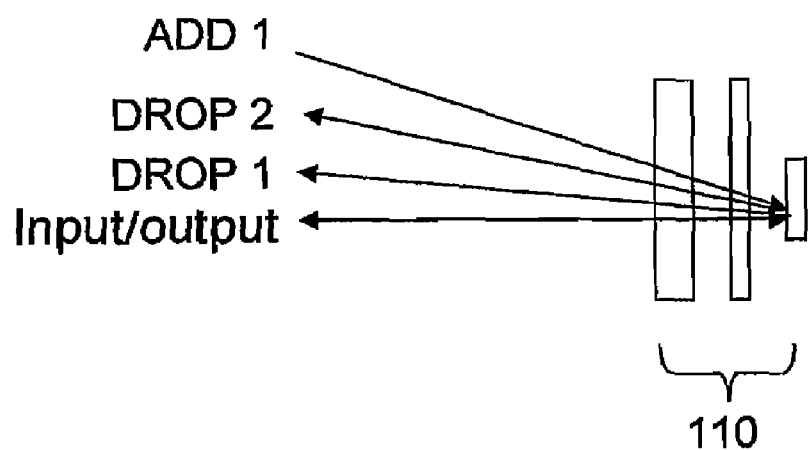

Reference is now made to FIGS. 11A and 11B, which illustrate a schematic wavelength selective Add/Drop router module, constructed and operative according to a further preferred embodiment of the present invention. FIG. 11A is a block diagram of the functionality, while FIG. 11B shows the implementation of the beam steering in such a system using MEMS mirrors. This Add/Drop router uses beam steering modules 110 such as those described in any of the various embodiments previously described in the present application. A circulator (not shown in FIG. 11B) is required at the main input/output port, in order to separate the input from the output signals in reflective embodiments. In such a case, the difference between an Add port and a Drop port is essentially one of nomenclature only, since the optical path between the input/output port and each of the Add or Drop ports is determined only by the beam switching and the beam steering commands, and these can be selected as desired.

Figure 12:
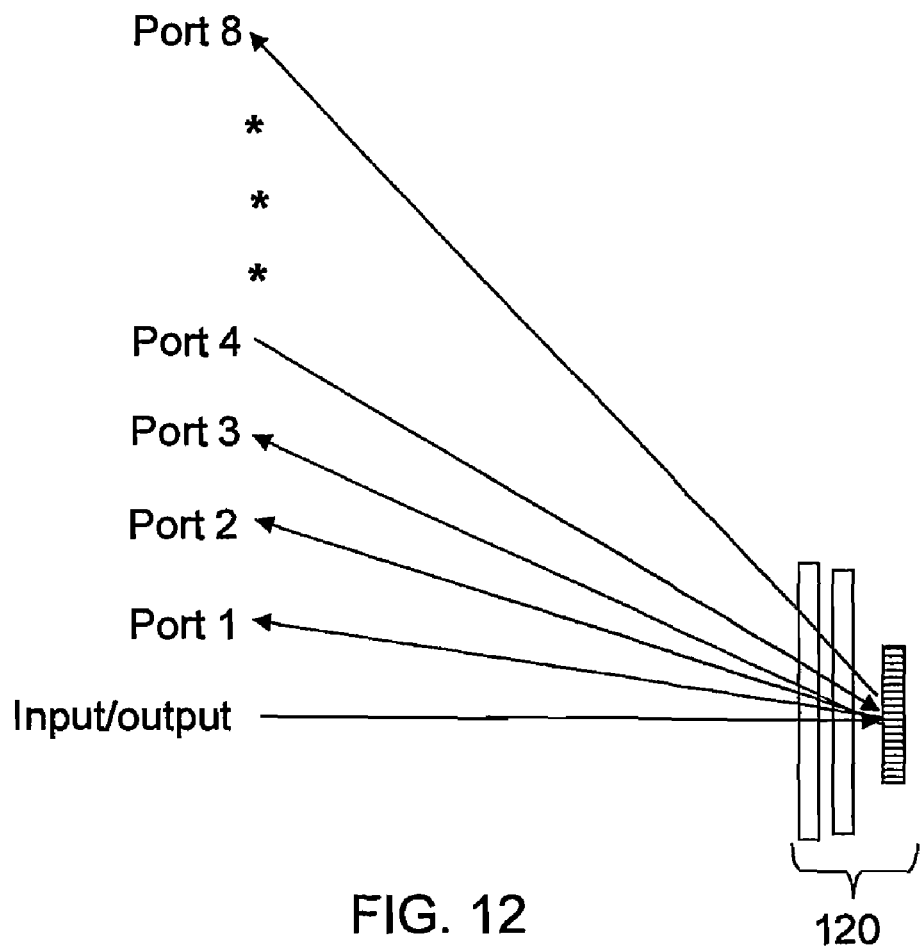
FIG. 12 shows the different steering angles generated by a MEMS mirror, directing the beam between the input/output port and any of the other ports of the router of FIGS. 11A and 11B.

This feature is illustrated schematically in FIG. 12, which shows the different steering angles generated by a MEMS mirror array 120, directing the beam between the input/output port and any of the other ports. The decision as to whether any port is called an Add or a Drop port is determined only by the direction of the signal being transmitted, whether into or out of the selected port.

It is also feasible to construct an Add/Drop router, according to a further preferred embodiment of the present invention, without the need for a circulator, using separate input and output ports, each of which utilizes a separate steered angle in the beam steering module. However, in this case, the control and programming of the beam steering array is significantly more complex, since the beam steering module then has to be programmed so that each port can be connected to any of the other ports. This also makes the accuracy of aiming of the MEMS mirrors significantly more critical, to ensure providing sufficient angular steering resolution for the increased number of steering angles required.

In the previously described MEMS embodiments of the beam steering module, the MEMS devices have been mirror arrays in a reflective embodiment of the router, with the output beams traversing essentially similar paths to those of the input beams, and passing through the same components as were used for the input beams.

Figure 13:
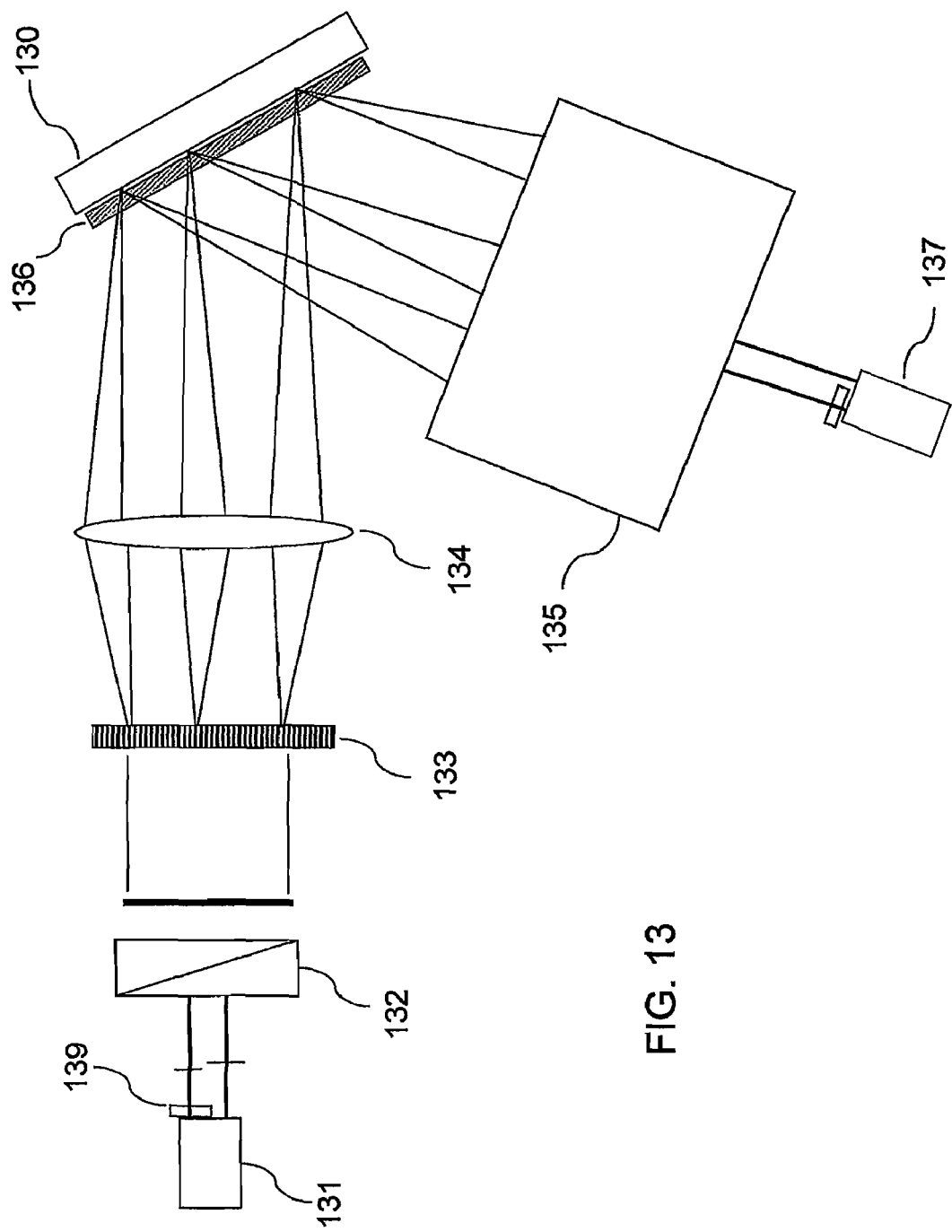
FIG. 13 illustrates a further preferred embodiment of the present invention, in which MEMS devices, based on reflection from mirrors, are used in a transmissive embodiment of the router of the present invention.

Reference is now made to FIG. 13, which illustrates a further preferred embodiment of the present invention, in which MEMS devices, based on reflection from mirrors, are nevertheless used in a transmissive embodiment of the router, in the sense that the input and output sections of the router are spatially distinct. The WSS shown in FIG. 13 comprises an input section, similar to that shown in the embodiment of FIG. 4A, with a fiber collimator followed by a birefringent walk-off crystal 131 with a half wave plate 139 over part of the output face, a beam expansion prism 132, a dispersive element 133, and a focusing lens 134 for focusing the beams onto a beam switching and steering module preferably comprising an LC device 136 and a MEMS array 130. However, unlike the embodiment of FIG. 4A, the steering module of FIG. 13 is aligned at an angle significantly different from normal incidence, such that the beams reflected from the MEMS mirrors are diverted in a direction away from the input optics path, and towards a completely separate set of optics components 135, generally equivalent to those used on the input side, and acting as an output optics system. As previously, the individual MEMS mirrors 130 are tilted at small angles around the average alignment direction, in order to steer individual beams along their desired path and to the on the output section 137 of the router. The output optics system can be either horizontally or vertically displaced from the input plane, depending on the geometrical configuration preferred, and on the feasibility of that geometrical configuration.

Figure 14:
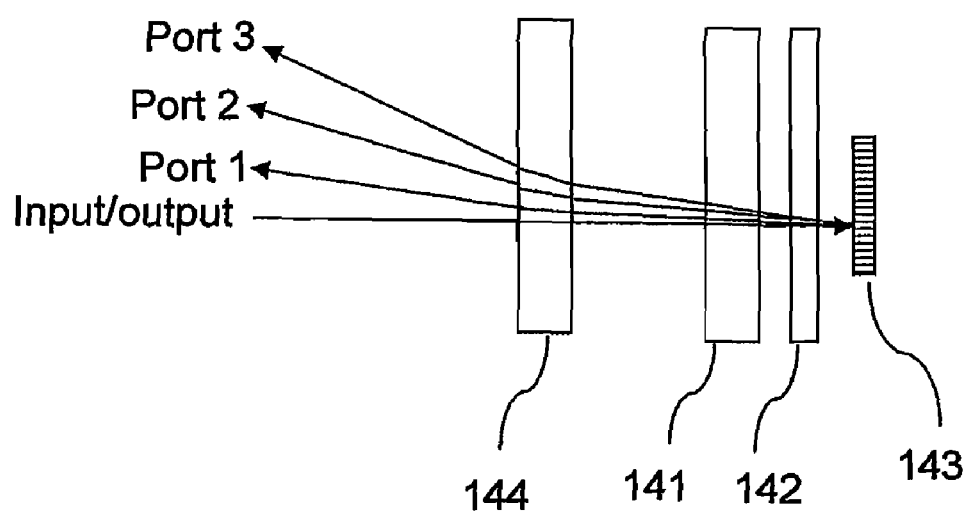
FIG. 14 illustrates yet a further preferred embodiment of the beam steering module for use in the reflective embodiments of the present invention using a phased array liquid crystal-on-silicon (LCOS) device.

Reference is now made to FIG. 14, which illustrates a further preferred embodiment of the beam steering module for use in the reflective embodiments of the present invention. According to this embodiment, the beam steering can be generated by use of a phased array liquid crystal-on-silicon (LCOS) device, with a phased linear array for each wavelength component. The linear phased array is then programmed to direct the beam to the direction desired for that wavelength according to the phase shifts applied to the various pixels in the phased linear array for each wavelength. A complete 2-dimensional LCOS array is then able to direct all of the wavelength channels of the device.

In FIG. 14, there is shown a schematic representation of a single wavelength channel of an LCOS beam steering assembly. The assembly preferably comprises a pixilated liquid crystal polarization rotation array 141, for selecting the desired transmissive, blocked or attenuated state of each wavelength channel, an optional linear polarizing element 142 to increase the extinction ratio of the polarization selection combination in the system, and an LCOS array 143 preferably comprising a thin layer of liquid crystal material disposed on top of a pixelated CMOS driving array, for reflectively steering the beam from the specific wavelength pixel shown in FIG. 14 back through that pixel, at a selected steered angle. The steered angle is dependent on the field applied to the LC elements of the phased array by the CMOS pixels in the LCOS array, each field generating a different phase shift in the light passing through the LC layer of the LCOS array. The arrangement of successive phase shifts in the array defines the steered angle, as is known in phased array technology.

According to another preferred embodiment of the LCOS beam steering phased array, it is possible to forgo the need for the separate pixilated liquid crystal polarization rotation array 141, and to perform both the attenuation and steering functions by means of the LC layer on the LCOS array. The desired attenuation can be achieved either by adjusting the reflected phase pattern to be less than optimal, such that part of the incident beam is not specularly reflected from the LCOS array, and the switched beam is thus attenuated as well as being steered, or by using optimal efficiency phased array steering, but adjusting the steering direction slightly so that the output beam does not fully overlap the output port, so that only part of the output beam is coupled out, as shown in the embodiments of FIGS. 5C and 5D. This embodiment leads to a simple beam steering module, although the control thereof is more complex.

In the preferred embodiment of FIG. 14, the beam steering module is shown with one input port and 3 output ports, though, as previously explained in relation to the MEMS embodiments of the present invention, this division is nominal, and any port can be used for any function, whether input or output. The beam steering arrays for the other wavelength channels to be handled by the WSS are disposed in the direction perpendicular to the plane of the drawing of FIG. 14.

The steering angles achievable with such an LCOS phased array are very small, generally of the order of a very few tenths of a degree. In FIG. 14, the deflection angles have been exaggerated, in order to render the operation of this embodiment visible. It is therefore generally difficult to use an LCOS beam steering array in practice without an auxiliary beam deflecting component 144, whose function is to increase the beam deflection angle so that the deflected beams can be resolved, and the beam steering array can be practically used. Such a deflection amplifying device can preferably be constructed using a diffractive optical element (DOE) or a holographic element, or a sequential series of reflecting surfaces, each successive reflector doubling the deflection angle achieved, or a divergent prism arrangement, though it is to be understood that the invention is not meant to be limited to these solutions.

Any of the above described embodiments of the WSS of the present invention can include a number of auxiliary functions which increase the usefulness of the device in practical systems. Channel power monitoring can be performed by splitting off a small percentage of the beam power, preferably at the output or drop ports, and this power coupled out can be directed onto an array of detectors which are used for determining the output power in each channel. Additionally, in those embodiments using a flat array of fibers as channel inputs, the signals can be input to the WSS at predefined lateral positions by using a V-groove input block, as is known in the art. Furthermore, a silicon waveguide array can be used at the input, with channels spaced as close as 9 microns from each other, thus reducing the size of the device. Use of a microlens array for focusing the input beams can then be advantageous.

It is appreciated by persons skilled in the art that the present invention is not limited by what has been particularly shown and described hereinabove. Rather the scope of the present invention includes both combinations and sub combinations of various features described hereinabove as well as variations and modifications thereto which would occur to a person of skill in the art upon reading the above description and which are not in the prior art.

We claim:

1. A wavelength selective switch comprising:
   at least a first port for inputting at least a first multi-wavelength optical signal;
   a plurality of output ports for outputting different wavelength components of said at least first multi-wavelength optical signal;
   a polarization transformation device for converting each of said at least first multi-wavelength optical signals into a pair of multi-wavelength optical beams disposed in a predetermined plane and having the same predefined polarization;
   a beam expanding device for laterally expanding said multi-wavelength optical beams of predefined polarizations in said predetermined plane;
   a wavelength dispersive element receiving said laterally expanded optical beams of predefined polarizations and dispersing wavelength components thereof in said predetermined plane;
   a polarization rotation element, pixilated generally along the direction of said dispersion, adapted to rotate the polarization of light passing through pixels thereof according to control signals applied to said pixels, such that the polarization of at least one wavelength component of said dispersed optical beams is rotated according to said control signal applied to the pixel through which said at least one wavelength component passes; and
   a pixilated beam steering element disposed such that said at least one wavelength component passing through a pixel of said polarization element is steered towards its desired output port according to the settings of the pixel of said beam steering device associated with said at least one wavelength component.

2. A wavelength selective switch according to claim 1 and wherein said at least one wavelength component is attenuated in accordance with said control signal applied to said pixel of said polarization rotation element associated with said at least one wavelength component.

3. A wavelength selective switch according to claim 1 and wherein said beam steering element comprises an array of Micro Electro-Mechanical System (MEMS) mirrors, each mirror of said array having a single axis of rotation.

4. A wavelength selective switch according to claim 1 and wherein said beam steering element comprises a Liquid Crystal on Silicon (LCOS) array.

5. A wavelength selective switch according to claim 4 and further comprising a beam deflecting element adapted to increase the steered beam deflection angle.

6. A wavelength selective switch according to claim 5 and wherein said beam deflecting element is any one of a diffractive optical element, a holographic element, a sequential series of reflecting surfaces, and a divergent prism assembly.

7. A wavelength selective switch according to claim 1 and wherein said beam steering element comprises a sequence of pairs of adjustable polarization rotation elements and birefringent prisms, wherein said at least one wavelength component is steered in accordance with the settings of said adjustable polarization rotation elements through which said at least one wavelength component passes.

8. A wavelength selective switch according to claim 1 and further comprising at least one optical element for focusing said dispersed wavelength components of said expanded light beams onto said beam steering element.

9. A wavelength selective switch according to claim 8 and wherein said optical element for focusing is any one of a lens and a wavelength dispersive element also having optical focusing power.

10. A wavelength selective switch according to claim 1 and wherein said polarization rotation element is a liquid crystal element.

11. A wavelength selective switch according to claim 1 and wherein said polarization transformation device is a birefringent walk-off crystal with a half-waveplate disposed on part of its output face.

12. A wavelength selective switch according to claim 1 and wherein said beam expanding device is any one of a pair of anamorphic prisms, a cylindrical lens telescope system, and a single prism.

13. A wavelength selective switch according to claim 1 and wherein said wavelength dispersive element is a diffraction grating.

14. A wavelength selective switch according to claim 3 and wherein said pixel of said polarization rotation element associated with said at least one wavelength component is controlled to block the passage of said at least one wavelength component during switching, at least when said at least one wavelength component crosses a path to an undesired output port.

15. A wavelength selective switch according to claim 1 and wherein said pixilated beam steering element is adapted to steer said at least one wavelength component in a direction such that said steered wavelength component does not cross the path of any other undesired wavelength component.

16. A wavelength selective switch according to claim 1 and also comprising a beam demagnifier disposed such that the dimensions of said multi-wavelength optical beams are reduced in the direction perpendicular to said plane of dispersion.

17. A wavelength selective switch according to claim 1 and wherein said pixilated beam steering element is a reflective element, such that said steered beam accesses its destined output port through those optical components used to direct said optical signal from said input port to said beam steering element.

18. A wavelength selective switch according to claim 1 and wherein said pixilated beam steering element is a transmissive element, such that said steered beam accesses its destined output port through additional optical components which direct said optical signal from said beam steering element to said output port.

19. A wavelength selective switch according to claim 1 and further comprising a beam monitoring array for determining the signal level in any port.

20. A method of switching selected wavelength components of at least one multi-wavelength input optical signal to a desired output port, said method comprising the steps of:
transforming the polarization of each of said multi-wavelength optical signals into a pair of multi-wavelength optical beams having predefined polarizations;
laterally expanding said multi-wavelength optical beams of predefined polarizations in a predetermined plane;
spatially dispersing in said predetermined plane, said laterally expanded, multi-wavelength optical beams into a series of spatially separated wavelength beams;
utilizing a polarization rotation element, pixilated generally along the direction of said dispersion, for rotating the polarization of light passing through pixels thereof according to control signals applied to said pixels, such that the polarization of at least one wavelength component of said dispersed optical beams is rotated according to said control signal applied to the pixel through which said at least one wavelength component passes; and
steering said at least one wavelength component passing through a pixel of said polarization element, by use of a pixelated beam steering device, towards its desired output port according to the settings of the pixel associated with said at least one wavelength component, of said beam steering device.

21. A method according to claim 20 and wherein said control signal applied to said pixel associated with said at least one wavelength component, of said polarization rotation element, is used to determine the attenuation of said at least one wavelength component.

22. A method according to claim 20 and wherein said step of steering is accomplished by using an array of Micro Electro-Mechanical System (MEMS) mirrors, each mirror of said array having a single axis of rotation.

23. A method according to claim 20 and wherein said step of steering is accomplished by using a Liquid Crystal on Silicon (LCOS) array.

24. A method according to claim 23 and further comprising the step of increasing the steered beam deflection angle by using a beam deflecting element.

25. A method according to claim 24 and wherein said beam deflecting element is any one of a diffractive optical element, a holographic element, a sequential series of reflecting surfaces, and a divergent prism assembly.

26. A method according to claim 20 and wherein said beam steering device comprises a sequence of pairs of adjustable polarization rotation elements and birefringent prisms, wherein said at least one wavelength component is steered in accordance with the settings of said adjustable polarization rotation elements through which said at least one wavelength component passes.

27. A method according to claim 20 and further comprising the step of focusing said dispersed wavelength components of said expanded light beams onto said beam steering element by means of at least one optical element.

28. A method according to claim 27 and wherein said focusing is performed by any one of a lens and a wavelength dispersive element also having optical focusing power.

29. A method according to claim 20 and wherein said polarization rotation element is a liquid crystal element.

30. A method according to claim 20 and wherein said polarization transformation device is a birefringent walk-off crystal with a half-waveplate disposed on part of its output face.

31. A method according to claim 20 and wherein said step of laterally expanding is performed using any one of a pair of anamorphic prisms, a cylindrical lens telescope system, and a single prism.

32. A method according to claim 20 and wherein said step of spatially dispersing is performed using a diffraction grating.

33. A method according to claim 22 and wherein said pixel of said polarization rotation element associated with said at least one wavelength component is controlled to block the passage of said at least one wavelength component during switching, at least when said at least one wavelength component crosses a path to an undesired output port.

34. A method according to claim 20 and wherein said pixilated beam steering element steers said at least one wavelength component in a direction such that said steered wavelength component does not cross the path of any other unsteered wavelength component.

35. A method according to claim 20 and also comprising the step of reducing the dimensions of said multi-wavelength optical beams in the direction perpendicular to said plane of dispersion by using a beam demagnifier.

36. A method according to claim 20 and wherein said pixilated beam steering element is a reflective element, such that said steered beam accesses its destined output port through those optical components used to direct said optical signal from said input port to said beam steering element.

37. A method according to claim 20 and wherein said pixilated beam steering element is a transmissive element, such that said steered beam accesses its destined output port through additional optical components which direct said optical signal from said beam steering element to said output port.

38. A method according to claim 20 and comprising the additional step of monitoring said at least one steered wavelength component for determining the optical signal level in any port.

39. A wavelength selective switch comprising:
at least a first port for inputting a multi-wavelength optical signal;
a plurality of output ports for outputting different wavelength components of said multi-wavelength optical signal;
a beam expanding device for laterally expanding at least one beam generated from said multi-wavelength optical signal in a predetermined plane;
a wavelength dispersive element receiving said at least one laterally expanded optical beam and dispersing wavelength components thereof in said predetermined plane;
a pixilated beam attenuating array operating on said dispersed wavelength components; and
a pixilated beam steering element adapted to steer at least one of said dispersed wavelength components towards a desired output port,
wherein said pixilated beam attenuating array is operated in co-operation with said beam steering device in such a manner that the steered beam is prevented from coupling into any output ports other than its desired output port.

40. A wavelength selective switch according to claim 39 and wherein said pixilated beam attenuating array is controlled to block transmission of said steered beam during switching at least while it traverses the paths to output ports other than said desired output port.

41. A method of switching selected wavelength components of a multi-wavelength input optical signal to a desired output port, said method comprising the steps of:
- generating at least one beam from said multi-wavelength input optical signal
- laterally expanding said at least one multi-wavelength optical beam in a predetermined plane;
- spatially dispersing in said predetermined plane said at least one multi-wavelength optical beam to generate wavelength components thereof;
- providing a pixilated beam attenuating array to attenuate said dispersed wavelength components; and
- steering at least one of said dispersed wavelength components towards a desired output port, wherein said steering is performed in co-operation with said attenuation in such a manner that the steered beam is prevented from coupling into any output ports other than its desired output port.

42. A method according to claim 41 and wherein said pixilated beam attenuating array is controlled to block transmission of said at least one steered wavelength component during switching, at least while it traverses the paths to output ports other than said desired output port.

* * * * *